(12) United States Patent
Chung et al.

(10) Patent No.: US 9,731,770 B2
(45) Date of Patent: Aug. 15, 2017

(54) FRONT PILLAR STRUCTURE INTEGRATED WITH FLANGE

(71) Applicants: HYUNDAI MOTOR COMPANY, Seoul (KR); KIA MOTORS CORPORATION, Seoul (KR)

(72) Inventors: Hee Seouk Chung, Hwaseong-si (KR); Si Young Park, Jeollanam-do (KR); Deok Hwa Hong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1 day.

(21) Appl. No.: 14/869,996

(22) Filed: Sep. 29, 2015

(65) Prior Publication Data

US 2016/0167713 A1  Jun. 16, 2016

(30) Foreign Application Priority Data

Dec. 11, 2014 (KR) .................. 10-2014-0178264

(51) Int. Cl.
*B62D 25/04* (2006.01)
*B62D 29/00* (2006.01)

(52) U.S. Cl.
CPC ........... *B62D 25/04* (2013.01); *B62D 29/008* (2013.01)

(58) Field of Classification Search
CPC .............................. B62D 25/04; B62D 29/008
See application file for complete search history.

(56) References Cited

U.S. PATENT DOCUMENTS

| | | | |
|---|---|---|---|
| 7,344,186 B1 | 3/2008 | Hausler et al. | |
| 7,543,883 B2 | 6/2009 | Chen et al. | |
| 8,171,769 B2 * | 5/2012 | Barthelemy | ........... B21D 15/03 72/370.22 |
| 2013/0234473 A1 | 9/2013 | Lange | |

FOREIGN PATENT DOCUMENTS

| | | |
|---|---|---|
| JP | H09-174671 A | 7/1997 |
| JP | 2001-328560 A | 11/2001 |
| JP | 2003-054446 A | 2/2003 |
| JP | 2003-276638 A | 10/2003 |
| JP | 2006-290103 A | 10/2006 |
| JP | 4033658 B2 | 1/2008 |

* cited by examiner

*Primary Examiner* — Glenn Dayoan
*Assistant Examiner* — Melissa A Black
(74) *Attorney, Agent, or Firm* — McDermott Will & Emery LLP

(57) ABSTRACT

A front pillar structure of a vehicle has a flange which connects an inner panel, an outer panel, and a side outer panel at a lateral side to which a door is mounted. The inner panel, the outer panel, and the flange between the inner panel and the outer panel integrally form from a tubular body having a closed cross-sectional shape.

6 Claims, 6 Drawing Sheets

-- Related Art --

-- Related Art --

-- Related Art --

-- Related Art --

FRONT PILLAR STRUCTURE INTEGRATED WITH FLANGE

CROSS-REFERENCE TO RELATED APPLICATION

This application claims under 35 U.S.C. §119 a the benefit of priority to Korean Patent Application No. 10-2014-0178264 filed on Dec. 11, 2014, the entire content of which is incorporated herein by reference.

TECHNICAL FIELD

The present disclosure relates to a front pillar structure of a vehicle. More particularly, the present disclosure relates to improvement of a front pillar structure of a vehicle having a flange, which increases rigidity and reduces deformation of a vehicle door a vehicle collision occurs.

BACKGROUND

In general, a vehicle includes a side seal, a front pillar (A-pillar), a B-pillar, and a C-pillar at a later side of a vehicle at which a door is mounted.

Referring to FIG. 1, a side seal 1 has a floor panel fixed thereto, and a front pillar 2 is fixed to a front end of the side seal 1. A B-pillar 3 is fixed to a central portion of the side seal 1. A C-pillar 4 is fixed to a rear wheel house connected to a rear end of the side seal 1.

As illustrated in FIGS. 2 and 3, the front pillar 2 includes: a front pillar outer upper reinforcing member 5; a roof side outer reinforcing member 6 which is coupled to an upper end of the front pillar outer upper reinforcing member 5; a front pillar inner upper panel 7 inside the roof side outer reinforcing member 6; a roof side inner rail 8 which is coupled to an upper end of the front pillar inner upper panel 7; and a front pillar outer reinforcing member 9. The A-pillar 2 further includes a side outer panel for exterior use.

Rigidity of the front pillar, among other pillars, is very important to protect a driver when a front collision occurs.

When a cross section increases thus to increase the rigidity of the front pillar, an obstruction angle for a driver increases. Further, it is difficult to assemble a vehicle body when assembling an outer side. When a tubular reinforcing member 11 is added, as illustrated in FIG. 4, spot welding cannot be applied to fix the reinforcing member to the inner panel, and further, since $CO_2$ welding is used, productivity deteriorates. In addition, it is difficult to improve a cross-sectional shape because a sealing shape needs to be maintained.

As a related art associated with a front pillar for a vehicle, there is a pipe reinforced member formed by hydroforming, which is fixed and welded to a roof inner panel. However, because spot welding cannot be applied to the pipe reinforced member, it is impossible to implement welding automation, and as a result, productivity deteriorates.

In another related art, a roof rail that forms a flange by hydroforming to form a tubular body and a longitudinally extending flange as a support rail which has a front pillar and a roof trail portion. However, welding is carried out after holes are formed in order to easily weld the flange, and as a result, productivity deteriorates, and a burst may occur at an end of the flange, which results in a number of defective products.

In addition, there has been introduced a structure in which a flange is formed at a front portion of a side rail inner panel and inserted into a pillar, and a roof reinforcing member, which has a door sealing flange, manufactured by pressure-resistant hydroforming.

The related art discloses a front pillar reinforced by hydroforming, however productivity is low and a burst phenomenon occurs at an end of a flange of the front pillar when forming the flange, thus reducing quality and rigidity.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the structure for enhancing rigidity of a front pillar of a vehicle in the related art, and an aspect of the present inventive concept provides a front pillar structure having a flange to increase rigidity.

According to an exemplary embodiment of the present inventive concept, a front pillar of a vehicle having a flange which connects an inner panel, an outer panel, and a side outer panel at a lateral side to which a door is mounted. The inner panel, the outer panel, and the flange between the inner panel and the outer panel are integrally formed from a tubular body having a closed cross-sectional shape.

The flange may be pressed and overlapped to have a thickness of at most two times a thickness of the tubular body to increase rigidity.

The flange has a hemming-shaped edge.

The hemming-shaped edge of the flange may have a flange space formed inside an end thereof.

The front pillar structure may be formed through a hot blower forming process by injecting air heated at a predetermined temperature into an internal space in the tubular body, which is disposed between an upper die and a lower die that have an inner contour corresponding to an outer contour of the front pillar, at predetermined pressure.

Both lateral portions of the tubular body are pushed and inserted into a gap with a predetermined depth, which is formed at both lateral portions of inner surfaces of the upper die and the lower die when the upper die and the lower die are coupled, to form the flange.

The upper die and the lower die may form a gap between lateral portions thereof, which is two times smaller than a thickness of the tubular body, such that the flange may be pressed and overlapped to increase rigidity.

The flange may have a hemming-shaped edge, which has a flange space portion and a bent and overlapping structure, and may be formed from the tubular body integrally with the inner panel and the outer panel. The hemming-shaped edge is formed in a die space at a hemming forming portion of the lower die between the upper die and the lower die. The hemming forming portion has a concaved bottom to be spaced apart from the upper die.

In the front pillar according to the present disclosure, a front pillar has the upper and lower flange integrally formed through a single process. The hemming part is formed at the end of the flange, and thus, rigidity is increased in comparison with a front pillar in the related art that is configured by joining a separate inner panel and a separate outer panel at a flange. A burst phenomenon does not occur at an end of the flange by forming the hemming-shaped edge at the end of the flange, and components such as a side outer panel may be joined by spot welding using a robot, thereby improving productivity, reducing the number of components and working processes and g weight.

Other aspects and exemplary embodiments of the inventive concept are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
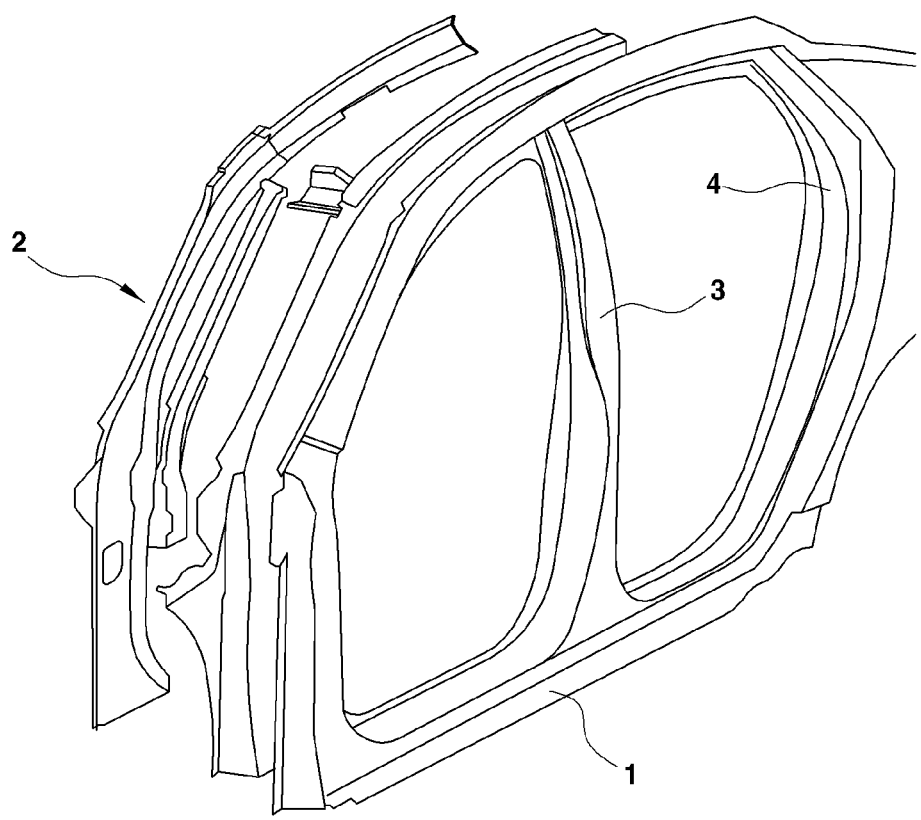
FIG. 1 is a schematic perspective view of a lateral part of a vehicle body, illustrating a front pillar structure of a general vehicle.
Figure 2:
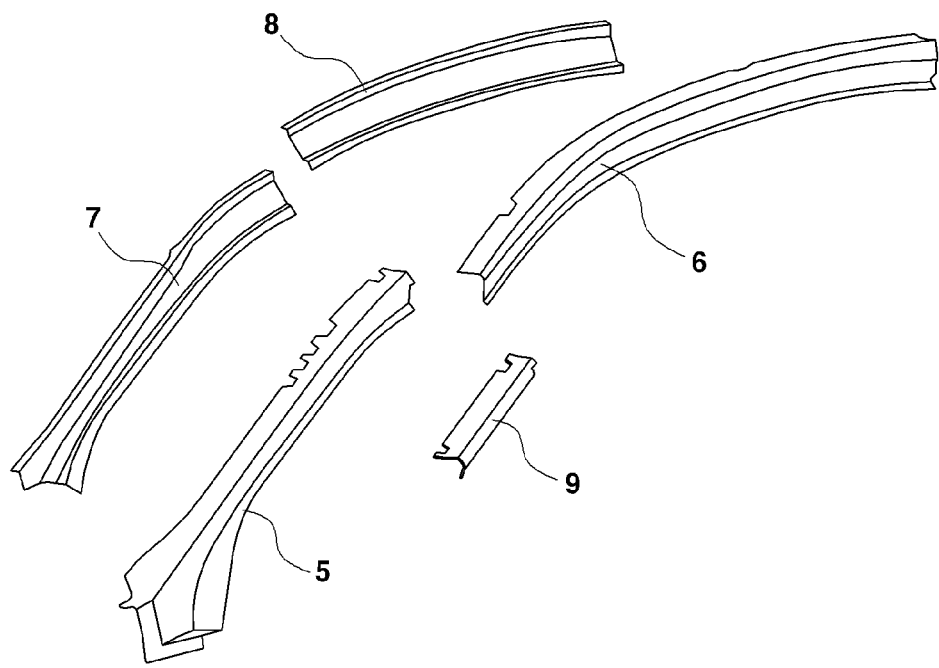
FIG. 2 is a schematic exploded perspective view illustrating an assembly structure of a front pillar of a vehicle in the related art.
Figure 3:
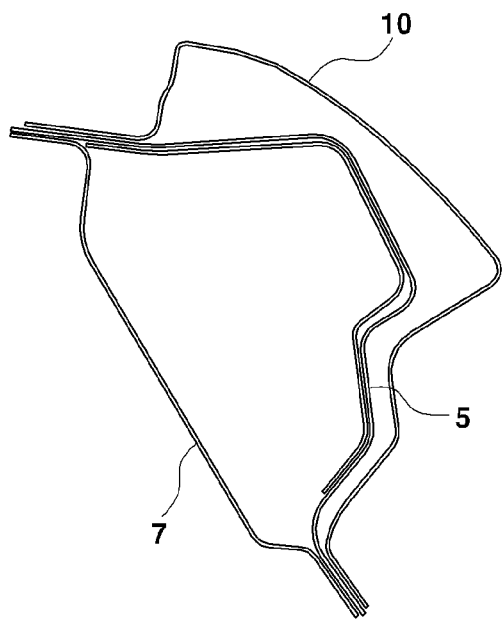
FIG. 3 is a cross-sectional view illustrating an assembled state of FIG. 2.
Figure 4:
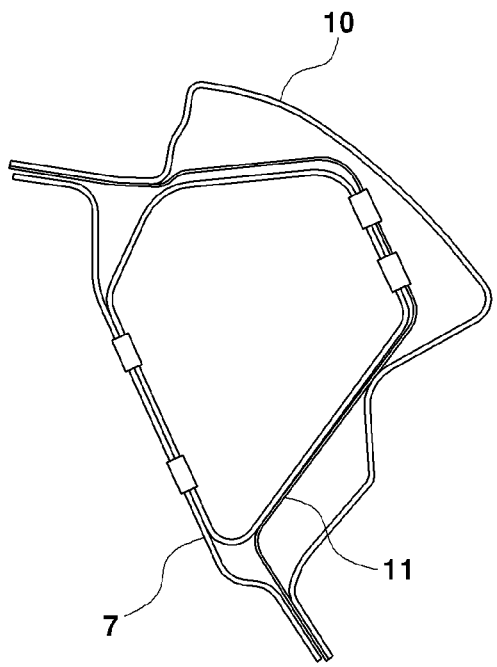
FIG. 4 is a schematic cross-sectional view of a structure having a tubular reinforcing member in a front pillar in FIG. 3.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the inventive concept will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, the present invention will be more specifically described with reference to the accompanying drawings illustrating a front pillar structure integrated with a flange according to an exemplary embodiment of the present disclosure.

Figure 5:
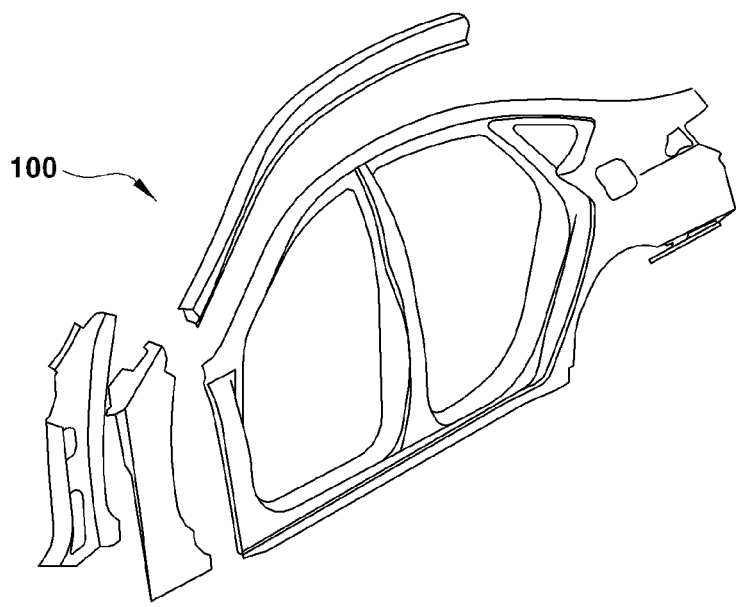
FIG. 5 is an exploded view of a front pillar for a vehicle according to the present disclosure.
Figure 6:
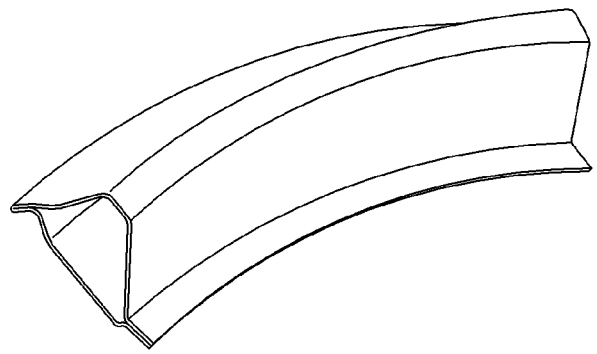
FIG. 6 is an enlarged view of the front pillar in FIG. 5.
Figure 7:
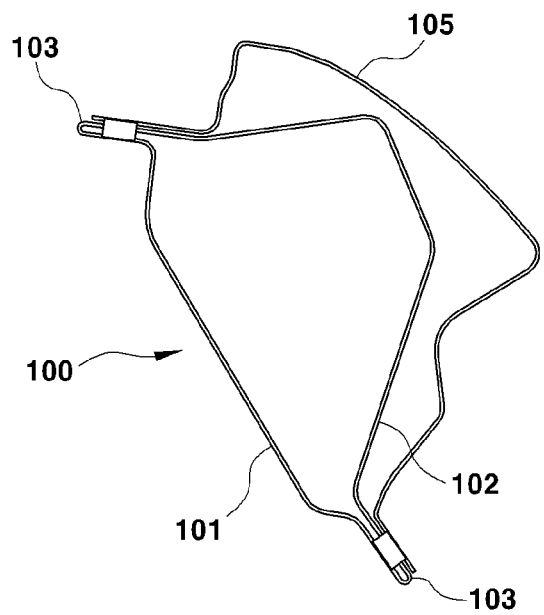
FIG. 7 is a cross-sectional view of FIG. 6, illustrating a state in which a side outer panel is mounted.

Referring to FIGS. 5 to 7, a vehicle front pillar 100 according to the present disclosure includes an inner panel 101, an outer panel 102, and a flange 103 which are integrally formed by a hot blower forming process.

Figure 8:
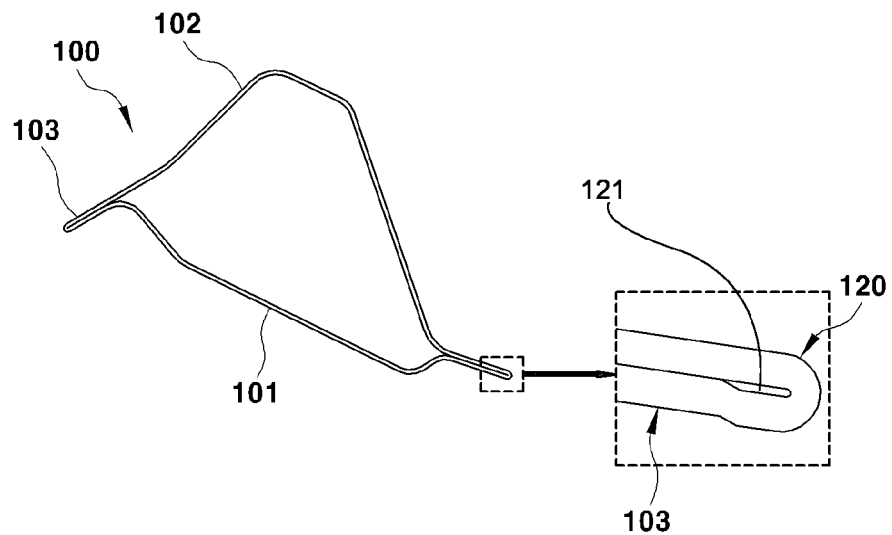
FIG. 8 is a cross-sectional view of a front pillar according to the present disclosure having a flange.

As illustrated in FIG. 8, the front pillar 100, the inner panel 101, and the outer panel 102 form a closed cross section by the hot blower forming from a pipe which has a closed cross section through the hot blower forming process. The flange 103, which is connected to a typical side outer panel 105 for exterior use, may be formed at upper and lower sides of the front pillar 100. When ends of the inner panel 101 and the outer panel 102 protrude outward, the flange 103 is formed by injecting heated air between the ends, and therefore, an extending portion of the inner panel 101 and an extending portion of the outer panel 102 overlap, and a flange space 121 is formed at an end of the flange 103.

Figure 9:
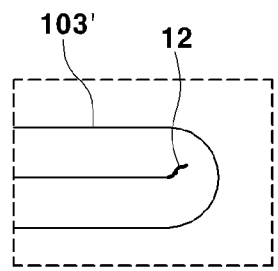
FIG. 9 is a partial cross-sectional view illustrating a burst phenomenon occurred at an end of a flange.

For example, a pillar member having a closed cross-sectional structure in which the inner panel 101 and the outer panel 102 are integrally formed as described above may be formed by hydroforming in the related art, as illustrated in FIG. 9, pleats 12 may be formed inside at an end of a flange 103' having a compressed shape, and thus, stress is concentrated at the pleats 12 causing a burst phenomenon.

According to the present disclosure, in order to prevent the burst phenomenon from occurring at the end of the flange that is integrally formed as described above, a hemming-shaped edge 120 is formed as shown in FIG. 8. The hemming-shaped edge 120 is formed by bending the flange 103 and the flange space 121 is formed at the outer end of the flange 103. Accordingly, pleat inside the flange 103 as disclosed in FIG. 9 is not generated.

Figure 10:
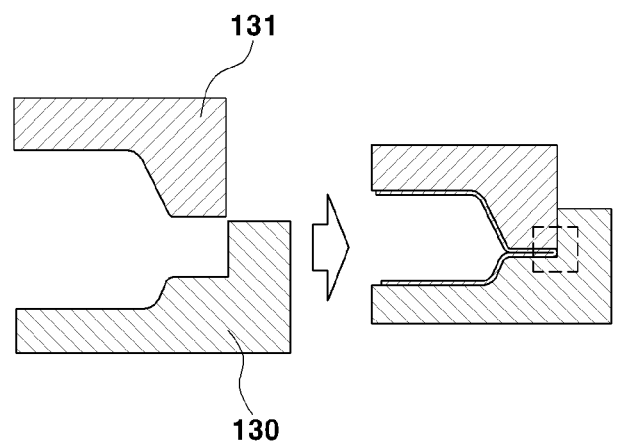
FIG. 10 is a schematic cross-sectional view illustrating a process of forming a front pillar according to the present disclosure.
Figure 11:
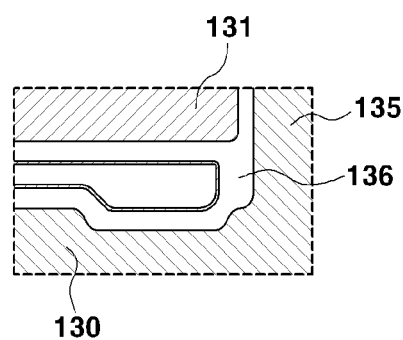
FIG. 11 is a partially enlarged view for explaining a process of forming a hemming-shaped edge of the flange in FIG. 10.

Referring to FIGS. 10 and 11, the flange 103, which has the hemming-shaped edge 120 at the end of the flange, is formed by a hot blower forming process using a hemming mold.

A tubular body illustrated as shown in FIG. 8 is disposed between a lower die 130 and an upper die 131 and corresponds to a contour of the front pillar 100. The upper die 131 moves downward at a predetermined pressure while air heated at a predetermined temperature is injected at a predetermined pressure into an internal space of the tubular body. Accordingly, the tubular body forms a shape of the front pillar 100.

In order to form the flange 103 of the front pillar 100, both lateral portions inside the lower die 130 and the upper die 131 are spaced apart from each other at a predetermined interval corresponding to a thickness of the flange 103 when the upper die 131 and the lower die 130 are coupled, thereby forming a gap. Accordingly, during the hot blower forming process, both lateral portions of the tubular body are pushed and inserted between the gap between the lateral portions inside the upper and lower dies 131, 130 by the heated and pressurized air, thereby forming the flange 103.

In order to form the hemming hemming-shaped edge 120, the lower die 130 has a hemming forming portion 135 thereon. The hemming forming portion 135 has a concave shape at a lower side thereof, such that there is a die space 136 between the upper die 131 and the lower die 130. The die space 136 has a vertical interval greater than the aforementioned gap between the lateral portions inside the upper and lower dies 131, 130, thereby forming the hemming-shaped edge 120.

Accordingly, when the integrated front pillar 100 is formed from the tubular body through the hot blower forming process, the tubular body is in contact with inner surfaces of the upper and lower molds 131, 130, which have the contour shape of the front pillar 100, by the heated air to form the contour of the front pillar 100. Both the lateral portions of the tubular body are pushed and inserted into the gap and formed between the lateral portions of the upper die 131 and the lower die 130 in which the lateral portions of the upper and lower dies 131, 130 form the flange 103. Then, the flange 103 forms the concave shape of the hemming forming portion 135 such that the flange 103 having a pressed and overlapping shape is formed, and at the same time, the hemming-shaped edge 120 of which the outer end has the flange space 121 is formed at the flange 103.

A depth of the gap corresponds to a protruding length of the flange 103 of the front pillar 100. In addition, the interval between the spaced lateral portions of the upper die 131 and the lower die 130 is at most two times the thickness of the inner, outer, and side outer panels 101, 102, 105. Therefore, the flange 103, which is integrally formed from the tubular body between the upper die and the lower die 131, 130, has a thickness of at most two times a thickness of the tubular body, for example, to have a thickness smaller than 2.4 mm, or to have a thickness of 2.0 mm, when the thickness of the tubular body is 1.2 mm, such that the flange 103 is pressed and overlapped between both the lateral portions of the upper die 131 and the lower die 130, thereby increasing rigidity of the flange 103.

A heating temperature of air is set to be lower than a phase change temperature of a material of the tubular body, and an injection pressure is set to be lower than the pressure by which the upper die 131 moves downward, such that the tubular body may deform in the mold to form the flange 103 with the hemming-shaped edge 120.

According to the present disclosure, since the inner panel, the outer panel, and the flange of the front pillar may be integrally formed from a single tubular body through a single forming process using a hemming mold by a hot blower process, an outer upper reinforcing member, a roof side outer reinforcing member which is coupled to an upper end of the outer upper reinforcing member, a front pillar inner upper panel inside the roof side outer reinforcing member, a roof side inner rail which is coupled to an upper end of the front pillar inner upper panel, and a front pillar outer reinforcing member of the related art may be formed using a single element. The plurality of components do not overlap each other to join other components, thereby reducing the number of processes of forming components and assembling components, weight, and material costs.

As described above, in comparison with rigidity of the front pillar in the related art that is configured by joining a separate inner panel and a separate outer panel at a flange, the front pillar structure according to the present disclosure exhibits an effect of about 36% increase in rigidity.

According to the front pillar of the present disclosure, since the hemming-shaped edge is formed at the end of the flange, a burst phenomenon does not occur, and the side outer panel may be joined by spot welding using a robot without pre-processing such as forming holes in the flange, thereby improving productivity.

The present disclosure may be used to manufacture the front pillar in which the outer panel, the inner panel, and the flange is integrally formed in order to enhance rigidity and improve productivity in a lateral structure in a vehicle to which a door is mounted.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A front pillar structure of a vehicle having a flange which connects an inner panel, an outer panel, and a side outer panel at a lateral side to which a door is mounted,
   wherein the inner panel, the outer panel, and the flange between the inner panel and the outer panel are integrally formed from a tubular body having a closed cross-sectional shape,
   wherein the front pillar structure is formed through a hot blower forming process by injecting air heated at a predetermined temperature into an internal space in the tubular body, which is disposed between an upper die and a lower die that have an inner contour corresponding to an outer contour of the front pillar, at predetermined pressure, and
   wherein the upper die and the lower die form a gap between lateral portions thereof, which is two times smaller than a thickness of the tubular body, such that the flange is pressed and overlapped to increase rigidity.

2. The front pillar structure of claim 1, wherein the flange is pressed and overlapped to have a thickness of at most two times a thickness of the tubular body increase rigidity.

3. The front pillar structure of claim 1, wherein the flange has a hemming-shaped edge.

4. The front pillar structure of claim 1, wherein the hemming-shaped edge of the flange has a flange space formed inside an end thereof.

5. The front pillar structure of claim 1, wherein both lateral portions of the tubular body are pushed and inserted into the gap having a predetermined depth, which is formed at both lateral portions of inner surfaces of the upper die and the lower die when the upper die and the lower die are coupled, to form the flange.

6. The front pillar structure of claim 1, wherein the flange has a hemming-shaped edge, which has a flange space and a bent and overlapping structure, is formed from the tubular body integrally with the inner panel and the outer panel,
   wherein the hemming-shaped edge is formed in a die space at a hemming forming portion of the lower die between the upper die and the lower die, and
   wherein the hemming forming portion has a concaved bottom to be spaced apart from the upper die.

* * * * *